Feb. 27, 1923.

A. F. POOLE

CALCULATING MACHINE

Filed Sept. 13, 1915

Witness:
Jno. H. Nelson

Inventor:
Arthur F. Poole

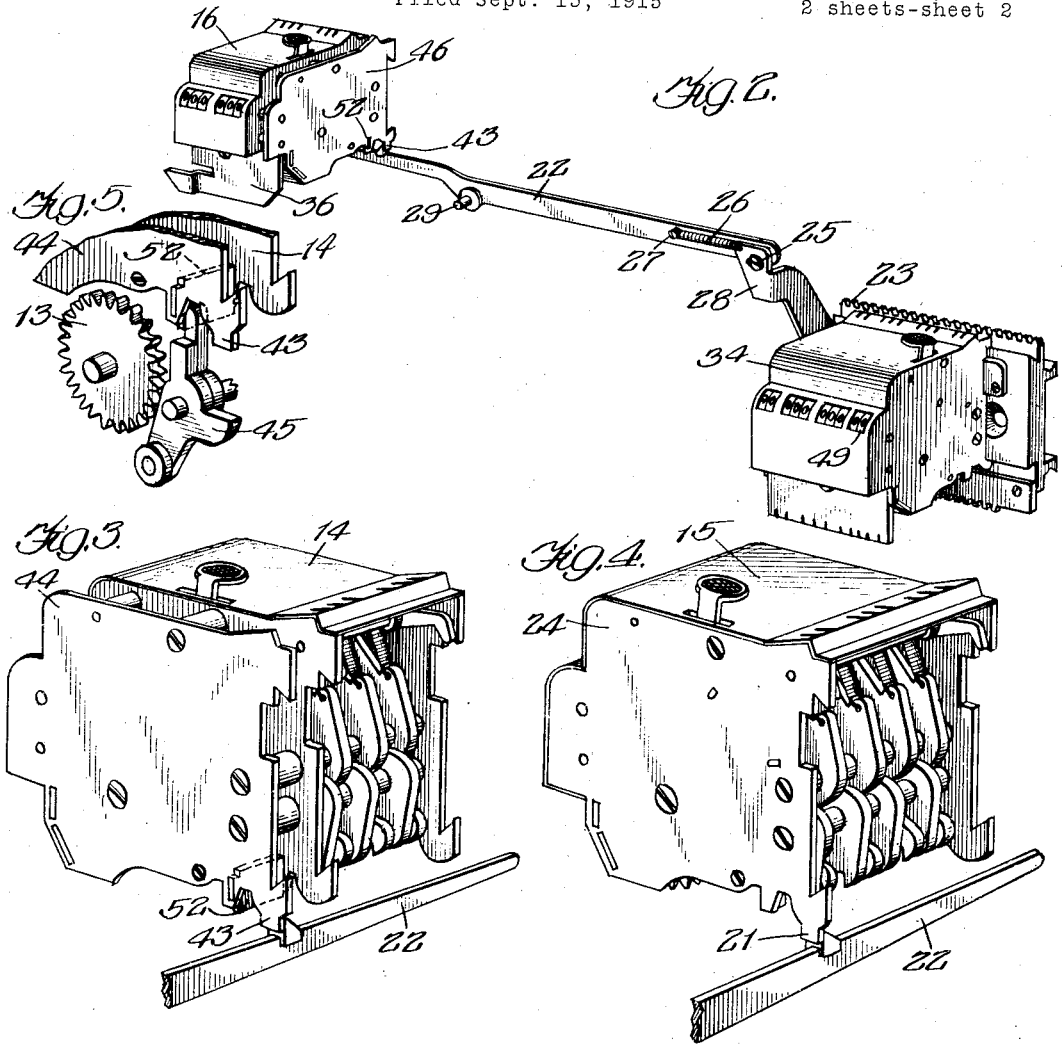

Patented Feb. 27, 1923.

1,446,990

UNITED STATES PATENT OFFICE.

ARTHUR F. POOLE, OF CHICAGO, ILLINOIS, ASSIGNOR, BY MESNE ASSIGNMENTS, TO REMINGTON ACCOUNTING MACHINE CORPORATION, OF NEW YORK, N. Y., A CORPORATION OF NEW YORK.

CALCULATING MACHINE.

Application filed September 13, 1915. Serial No. 50,393.

*To all whom it may concern:*

Be it known that I, ARTHUR F. POOLE, of Chicago, county of Cook, and State of Illinois, have invented certain new and useful Improvements in Calculating Machines, of which the following is a specification.

My invention is an improvement in calculating machines, and has for its object the provision of a calculating machine to handle certain classes of accounts hereinafter to be set forth.

My invention may be best understood by reference to the drawings in which:

Figure 2 is a detail showing the connection between the cross and vertical totalizers.

Figure 3 is a back view of one of the vertical totalizers used to compute in one table.

Figure 4 is a back view of a vertical totalizer used for computing in a second table.

Figure 5 is a detail of the totalizer shown in Figure 3 and part of the actuating means therefor.

Figure 6 is a form of account adapted to be calculated on my improved machine.

Figure 1:
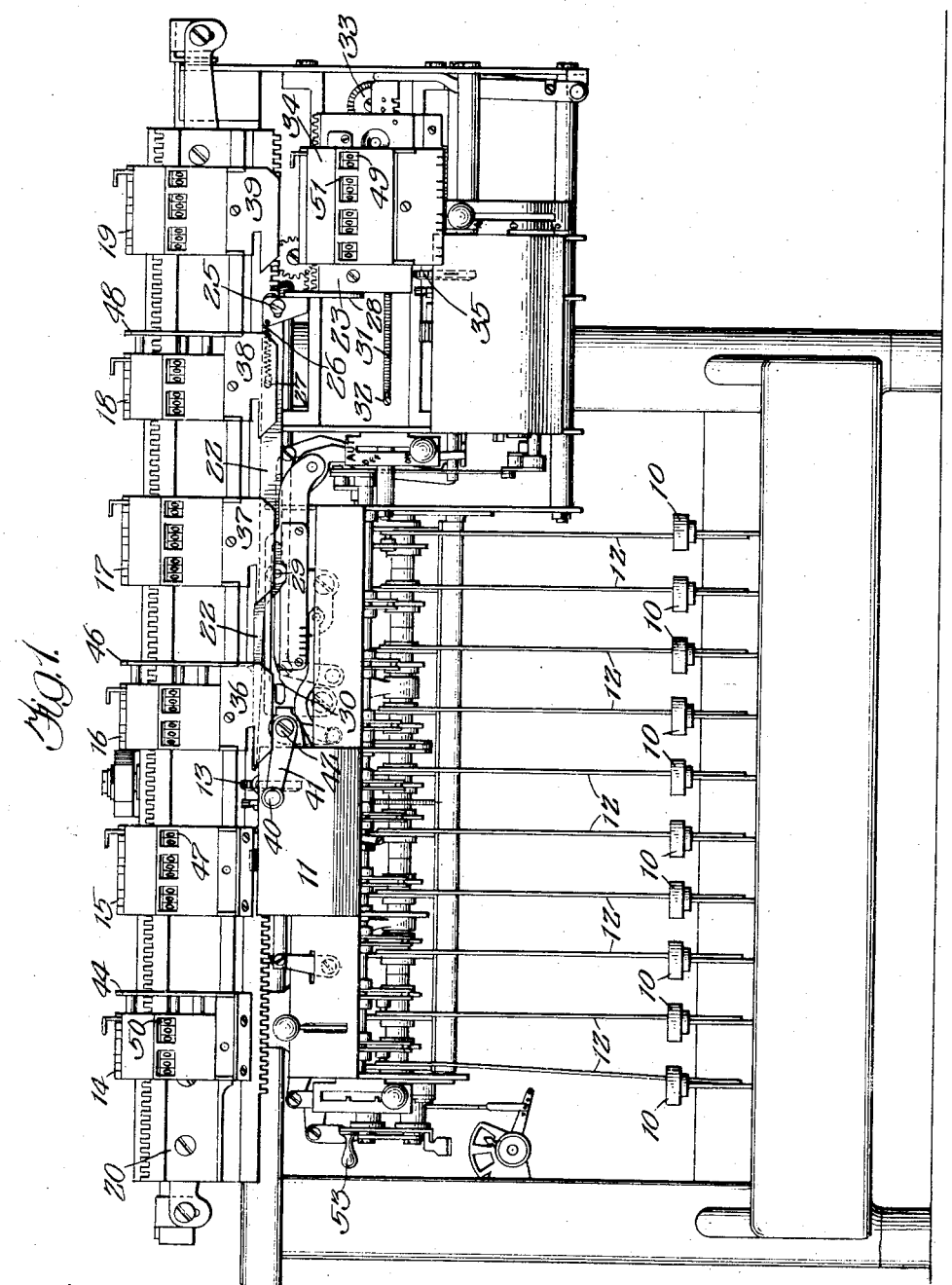
Figure 1 is a front view of one embodiment of my invention.

Before entering into a description of the machine itself I will first describe the form of account which is calculated on my machine. An example is given in Figure 6, in which is shown a sheet having figures arranged in six columns, A, B, C, D, E and F. The figures in column A represent the weights of goods sold. Those in column B represent the price of the same. The figures in column C represent the weight of goods returned. Those in column D the price of the same. Figures in column E represent the net weight, that is, the goods sold less the goods returned, and correspondingly the figures in column F are the net amounts of money, that is, the amount of goods billed out less the amount or value of the goods returned. In writing this sheet it is desirable to get a footing of the cross figures in the horizontal lines, that is, the operator wishes to know the difference between 625 and 432 pounds and write the answer in colmn E. She also wishes to know the net amount, or B minus D, in order to know the amount to write in column F. Also during this computation the operator wishes to keep an account of the vertical footings of the numbers written in columns A, B, C, D, E and F, so that when the day's work is finished she will have a record of the total weight of the goods billed, the total weight of the goods returned, and the total net weight; also the total value of goods billed, total value of goods returned, and the net value.

When cross footing the form of account shown in Figure 6 it is evidently necessary to have totalizers handling the varieties of tables. The totalizer which handles the weights is spaced differently from the totalizers handling money, since the latter has a decimal or pointing off space between the dollars and cents and also between the thousands and hundreds group. My invention is a means of cross footing in these different tables with a single totalizer, and in brief it consists of handling the weights denominations in one part of the cross footing totalizer and handling the money denominations in another part of the cross footing totalizer, and in providing mechanical interlocks in order that these two operations may be carried on without interference. Another object of my invention is to disclose a new method of computing accounts in two different tables by the use of a single totalizer. In my herein described machine I have shown amounts in weights and in money computed in the same totalizer. In the particular example shown the base is the same, that is 10. However, my method may be used as hereinafter pointed out in the computation to different bases, for instance, one may compute quantities expressed in pounds and ounces, in which the bases are 16 and 10, and also compute quantities in money in which the base is 10. Both of these computations by the use of my herein described method may be made in the same totalizer. Having thus described the use for which my improved machine is designed, I will now describe its operation.

Reference to Figure 1, which is a front view of my improved machine, will disclose that my machine is a modification of the Wahl adding and subtracting typewriter machine of the form which has a series of vertical totalizers, which are adapted to have numbers inserted in them by a master wheel and a single cross footing or jumping totalizer, which is adapted to have simultaneously entered into it the numbers entered in the vertical totalizers, In other words, it is a Wahl type of cross footing machine. It is not necessary for me to go into an extended description of machines of this kind, since they are well known in the art. One example is shown in my Patent No. 1,198,050, granted Sept. 12, 1916. In said patent is shown a Wahl machine having a series of vertical totalizers and also a cross totalizer adapted to co-operate with said vertical totalizers, and also an automatic gear shifting device, so that the travel of the typewriter carriage determines the direction in which numbers are entered into the cross totalizer.

Referring again to Figure 1, 10 represents the numeral keys of a Remington typewriter which are connected to an actuating mechanism 11 by the pull rods 12. Depression of the keys 10 ultimately results in a rotation of a master wheel 13, a number of steps depending upon the particular numeral key operated. Inasmuch as the mechanism by which this motion is accomplished is thoroughly described in the Patent No. 893719 to John C. Wahl, I shall not herein go into the details of said mechanism. 14, 15, 16, 17, 18 and 19 are vertical totalizers mounted on the truck 20 which is connected to and moves with the typewriter carriage. These vertical totalizers are located on the truck to correspond to the positions of columns A, B, C, D, E and F on the worksheet (Figure 6). Numbers written in column A are entered in totalizer 14, numbers written in column B in totalizer 15, and so on. The internal mechanism of these totalizers also has been very thoroughly described in said issued patent, to which reference may be had for the details of the totalizer structure. Each one of the vertical totalizers 15, 17 and 19 has on its right side plate 24 a heel 21 (Figure 4) which is adapted to engage with a hook 22 pivotally mounted on the cross truck 23 at 25, said cross truck being adapted to reciprocate in the framework. A spring 26 extending from a stud 27 in the hook 22 to an arm 28 on the cross truck 23 serves to give the hook 22 a tendency to rise and engage the heel 21 since this spring 26 extends above the line drawn from the stud 27 to the pivot 25. The hook 22 has mounted in it a releasing stud 29 which co-operates with a cam mounted on the frame of the machine. A spring 31 is attached to a stud 32 on the frame of the machine and after passing over a pulley 33 mounted in the frame of the machine is attached to the cross truck 23, and serves to give said cross truck a tendency to return to its position as shown in Figure 1, when said truck is displaced therefrom by reason of any of the vertical totalizers picking up the hook 22 and thereby moving the cross totalizer 34 synchronously with it. The cross totalizer 34 is adapted to have numbers entered in it by the auxiliary master wheel 35 which is connected to the master wheel 13 by mechanism shown in my cited Patent No. 1,198,050. The direction of the rotation of the master wheel 35 is controlled by cams 36, 37, 38 and 39 mounted on the totalizers 16, 17, 18 and 19 respectively. During the travel of a typewriter carriage and therewith connected truck 20, these cams engage a roller 40, mounted on an arm which is pivoted in the framework at 42, and thus determine the direction of rotation of the master wheel 35 by a gear shift device. The gear shift device employed is very thoroughly described in my Patent No. 1,273,180, dated July 22, 1918, and I shall therefore not describe it here. It is sufficient for the understanding of my present invention to premise that the direction of rotation of the gear wheel 35 is determined by the position of the roller 40. When said roller is in the position shown in Figure 1 the master wheel 35 will move in the same direction as the master wheel 13, thereby producing addition both in the cross totalizer 34 and the particular vertical totalizer 14 or 15 with which said cross totalizer is at that time connected. When any of the cams 36, 37, 38 or 39 engage with the roller 40, said roller is thrown to its alternative position, thereby determining that the master wheel 35 will produce subtraction in the cross totalizer 34 simultaneously with the master wheel 13 producing addition in any of the vertical totalizers 16, 17, 18 or 19 with which said cross totalizer 34 may be at that time connected.

Reference to Figures 1 and 3 will disclose that each of the vertical totalizers 14, 16 and 18 is provided with an auxiliary side plate 44, 46 and 48. Reference particularly to Figure 3, in which is shown the cross totalizer 14, will disclose that auxiliary side plate 44 is provided with a heel 43, also adapted to co-operate with and engage the hook 22 as previously described in connection with the vertical totalizers 15, 17 and 19. However, owing to the displacement of side plate 44 when the cross totalizer 34 co-operates with the vertical totalizer 14 and the master wheel 13 enters a number in the units place 50 of said totalizer, the master wheel 35 will enter the same number in the units of dollars place 51 of the cross totalizer 34, this being the third wheel from the right in said totalizer 34. This being the case, it will be seen that if one were to enter the number 123 456 in the vertical totalizer 14 the cross totalizer 34 would show 00 123 456 00. If we disregard the two zeros to the right, the number exhibited in the cross totalizer 34 will correspond to the number exhibited by the vertical totalizer 14. As before noted, the side plates of the vertical totalizers 16 and 18 are displaced similarly to those of the vertical totalizer 14.

From the above it will be clear that in entering numbers in the vertical totalizers 14, 16 and 18 the last two places on the cross totalizer 34 are not used. In order to prevent accidental insertion of a number in these two last places I have provided (Figure 3) a locking plate 52 which is rigid in the frame of the totalizer 14, and is adapted to contact with the usual master dog 45 of the Wahl actuator. Reference to the cited patent to Wahl will disclose that if the master dog 45 is prevented from rotating in a counter clockwise direction (Figure 5) that depression of the keys of the adding machine is prevented, this action being the same as the lock which is provided in the decimal or pointing off spaces of the totalizer. Therefore, after one has inserted a number in the right hand or last space of the totalizer 14, the keys of the adding machine are locked until the cross totalizer 34 is disconnected from the totalizer 14 by the action of the stud 29 upon the cam 30, as previously described.

The heels 21 of the totalizers 15, 17 and 19 are in their usual position. Therefore the lowest decimal place 47 of the totalizer 15, for instance, will be in mesh with the master wheel 13 at the same time as the lowest decimal place 49 of the totalizer 34 is in mesh with the auxiliary master wheel 35.

Having described my mechanism, I will now describe the operation of my machine in handling the form of account shown in Figure 6. For the sake of clearness I have not shown any tabulating mechanism connected with the typewriter. However, it is to be understood that the Remington typewriter used in connection with my adding attachment is provided with the usual tabulating mechanism.

The operator first tabulates to the hundreds place in column A, and presses the keys 6, 2 and 5 in the order stated. This enters 625 in the vertical totalizer 14, and at the end of the operation the cross totalizer 35 shows 625 00. The operator next tabulates to the hundreds place of column C and presses the keys 4, 3 and 2 in the order stated. The vertical totalizer 16 associated with said column will then show 432, and the cross totalizer, because of the cam 36 determining that the number just entered should be entered in the cross totalizer in subtraction, will show 193 00. The operator then tabulates to the hundreds place of column E and writes the number 193 exhibited in the cross totalizer 34, disregarding the two ciphers shown to the right. The number 193 is thereby subtracted from the cross totalizer 34 and entered into the vertical totalizer 18. The cross totalizer 34 is now clear. Without line spacing her paper the operator now returns the carriage and tabulates to the tens place of column B, writing the number 12 50 which is simultaneously entered in totalizers 15 and 34. She next tabulates to the dollars place of column D and writes the number 8 64, which number is added in totalizer 17 and subtracted from the cross totalizer 34, which consequently shows 3 86. The operator then tabulates to the dollars space of column F and copies the number 3 86 appearing in the cross totalizer 34, which number is entered in the vertical totalizer 19 and subtracted from the cross totalizer 34, leaving the latter clear and ready to begin the computation of the next line.

The operator then line spaces her paper, returns the carriage and tabulates to write the number 738 in column A. She next writes the number 27 in column C, and writes the number 711 then appearing in the cross totalizer 34 in column E. The writing of these three numbers in columns A, C and E will add them to the numbers already in totalizers 14, 16 and 18 respectively. The cross totalizer is then clear ready to compute the figures in columns B, D and F, to which columns the operator successively tabulates the machine, writing the numbers in the order shown. This completes the computation of the second line of Figure 6.

It is not necessary to describe in detail the computation of the remaining figures, except to say that on wishing to take out the total of her day's work, the operator manipulates the reversing handle 53, which by means of mechanism disclosed in my cited Patent No. 1,273,180 reverses the direction of rotation of both the main master wheel 13 and the auxiliary master wheel 35. The totals appearing in the vertical totalizers 14 to 19, inclusive, are now copied out. During this copying it is not necessary to write first the weight appearing in columns A, C and E respectively, and then return and write the amounts of money appearing in columns B, D and F. The numbers may be copied in the order in which they appear in Figure 6, that is, first the number in column A, then the number in column B, then the number in column C, and so on. If the computation has been done correctly, all the totalizers will return to zero, this including the cross totalizer 34.

Referring to Figure 1 it will be seen that the vertical totalizer 18 is the one accumulating the grand totals of the numbers written in the column E (Figure 6), and the totalizer 19 accumulates the grand totals of the numbers written in the column F, the same figure. The totalizer 18 contains the difference of the numbers in totalizers 14 and 16. Similarly the totalizer 19 contains the difference of the numbers in totalizers 15 and 17. Therefore, if one were to set the vertical actuator in subtraction and subtract all of the totals appearing in the totalizers 14, 15, 16, 17, 18 and 19, the cross totalizer 34 would show zero as a result of such an operation.

While I have shown my machine as adapted to compute the particular problem cited in Figure 6, it is obvious that this problem is only one of a large class which may be handled by my improved machine. This class may be defined as a problem in which it is desired to handle two distinct concrete quantities, and these quantities may differ in the tables in which they are computed. For instance, it is obvious that if the totalizers 15, 17 and 19 had the last decimal places arranged to compute in quarters instead of in tenths, that one could perform computations according to the method herein described with these two classes of quantities and use the same cross footing totalizer to compute in both tables without interference. Many variations may be made from the precise method herein disclosed without departing from the spirit of my invention. Mechanical equivalents may be substituted for many of the parts. Since I have described my invention only in its preferred form, there will be obvious many useful modifications, all of which will be apparent to those skilled in the art.

I claim:

1. In a calculating machine, the combination of: a jumping totalizer; a moving carriage, a series of vertical totalizers mounted on said moving carriage; and connecting mechanism adapted to connect the jumping totalizer to the vertical totalizers seriatim during the travel of the carriage, said connecting mechanism being so arranged that the units place of one of the vertical totalizers will correspond to a certain position of the jumping totalizer and the units place of the second vertical totalizer will correspond to a second place of the cross totalizer.

2. In a calculating machine, the combination of: a jumping totalizer; a traveling carriage; vertical totalizers mounted on said traveling carriage; a master wheel adapted to enter numbers in the cross totalizer; a second master wheel adapted to enter numbers in the vertical totalizers; connecting locations on said traveling carriage; connecting mechanism adapted to cooperate with said locations and thereby determine a vertical totalizer and jumping totalizer to move together during the insertion of a number, said connecting locations being in a different position on one of the vertical totalizers than on the succeeding one of the vertical totalizers.

3. In a calculating machine, the combination of: a jumping totalizer; a set of vertical totalizers; a traveling carriage; pickup stops on the traveling carriage adapted to connect the jumping totalizer thereto; said pickup stops being arranged in one decimal location in reference to one of the vertical totalizers and a different decimal location in respect to another one of the vertical totalizers.

4. In a calculating machine, the combination of a vertical totalizer; a jumping totalizer; mechanism for entering a number simultaneously in the vertical and jumping totalizers; and locking mechanism whose operation is determined by the vertical totalizer to prevent the insertion of a number in the lowest decimal place of the jumping totalizer.

5. In a calculating machine the combination of a travelling member, printing means whose place of operation is determined by said travelling member, a totalizer having a plurality of decimal orders, a set of keys adapted to enter numbers in said totalizer and also simultaneously operate said printing mechanism, and means controlled by said travelling member to bring one decimal order of the totalizer in correspondence with the last digit of the number printed when the travelling member is in one position and to bring a different decimal order of the totalizer in correspondence with the last digit of a number printed when the travelling member is in a second position.

6. In a calculating machine, the combination of: a vertical totalizer; a jumping totalizer; mechanism for entering a number simultaneously in the vertical and jumping totalizers; and locking mechanism consisting of a locking bar, whose operation is determined by the position of the vertical totalizer to prevent the insertion of a number in the lowest decimal place of the jumping totalizer.

7. In a calculating machine, the combination of: a vertical totalizer; a jumping totalizer adapted to be connected thereto; numeral keys; master mechanism adapted to insert numbers simultaneously in both the vertical and jumping totalizers, said master mechanism including an element which is moved upon the operation of any of said numeral keys; and a locking means adapted to cooperate with said universal member and thereby prevent the operation of the numeral key when said master mechanism is operating in the lowest place of the cross totalizer.

8. The herein described method of using a single totalizer to compute amounts in two different tables, which consists of first accumulating the numbers using the lowest decimal order of the totalizer as the decimal order in which the digit of the lowest order of numbers in the first table are entered and afterwards computing the numbers in the other table by entering the digit in the lowest order of said numbers in a higher decimal order of the totalizer.

9. The herein described method of using a cross footing totalizer to cross foot amounts in two tables, which consists in entering the digits in the lowest order of the numbers in one table in the lowest decimal order of the totalizer and in entering the digit in the lowest order of numbers in the second table in a higher decimal order of the totalizer.

In witness whereof, I have hereunto signed my name this 11th day of Sept., 1915.

ARTHUR F. POOLE.